(12) United States Patent
Fukuhara et al.

(10) Patent No.: US 11,491,934 B2
(45) Date of Patent: Nov. 8, 2022

(54) STRUCTURE OF VEHICLE ELECTRIC EQUIPMENT

(71) Applicant: NISSAN MOTOR CO., LTD., Yokohama (JP)

(72) Inventors: Yusuke Fukuhara, Kanagawa (JP); Seiichi Sato, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/611,954

(22) PCT Filed: May 20, 2019

(86) PCT No.: PCT/JP2019/019924
§ 371 (c)(1),
(2) Date: Nov. 17, 2021

(87) PCT Pub. No.: WO2020/234969
PCT Pub. Date: Nov. 26, 2020

(65) Prior Publication Data
US 2022/0227319 A1     Jul. 21, 2022

(51) Int. Cl.
*H02G 3/00* (2006.01)
*B60R 16/023* (2006.01)
*H02G 3/14* (2006.01)
*H02G 3/16* (2006.01)

(52) U.S. Cl.
CPC .......... *B60R 16/0239* (2013.01); *H02G 3/14* (2013.01); *H02G 3/16* (2013.01)

(58) Field of Classification Search
CPC ......... B60R 16/0239; H02G 3/14; H02G 3/16
See application file for complete search history.

(56) References Cited

U.S. PATENT DOCUMENTS

| 8,011,977 B2 * | 9/2011 | Tsuruta | H01R 13/4365 |
| | | | 439/752 |
| 9,429,360 B2 * | 8/2016 | Hsiao | F26B 3/28 |
| 9,893,459 B2 * | 2/2018 | Zhao | H01R 24/60 |
| 2005/0266740 A1 | 12/2005 | Kikuchi et al. | |

(Continued)

FOREIGN PATENT DOCUMENTS

| JP | 2000-69764 A | 3/2000 |
| JP | 2006-14577 A | 1/2006 |

(Continued)

*Primary Examiner* — Pete T Lee
(74) *Attorney, Agent, or Firm* — Foley & Lardner LLP

(57) ABSTRACT

A structure of vehicle electric equipment including a restriction member restricting removal of a bolt for fixing a cover. The restriction member includes first and second portions. The first portion is disposed at a position overlapping with at least a part of a distal end of a connector of an electric cable when seen from an attachment/detachment direction and between the distal end and a portion of the housing opposed to the distal end in the attachment/detachment direction. The second portion is positioned on an axial extension of the bolt fixing the cover. Sum of a gap between the bolt fixing the cover and the second portion and a distance in the attachment/detachment direction between the distal end of the connector in a complete fitting state and the first portion is smaller than a length from an opening of the screw hole to a tip of the bolt.

7 Claims, 7 Drawing Sheets

(56) References Cited

U.S. PATENT DOCUMENTS

2013/0008903 A1  1/2013  Sakamoto et al.
2014/0127939 A1  5/2014  Ishibashi et al.

FOREIGN PATENT DOCUMENTS

| JP | 2014-93289 A | 5/2014 |
| JP | 2017-60225 A | 3/2017 |
| KR | 10-2013-0125024 A | 11/2013 |
| WO | WO 2012/070140 A1 | 5/2012 |

* cited by examiner

STRUCTURE OF VEHICLE ELECTRIC EQUIPMENT

TECHNICAL FIELD

The present invention relates to a structure of vehicle electric equipment such as an inverter, a DC/DC converter, a junction box and an electric air conditioner compressor.

BACKGROUND ART

In inverters, a terminal connection section is provided in a housing, and a terminal of electric wiring from a motor or a battery is connected to the terminal connection section. Patent Document 1 discloses related technology.

CITATION LIST

Patent Literature

Patent document 1: Japanese patent laid-open publication No. 2000-69764

SUMMARY OF INVENTION

Technical Problem

An opening for permitting access to, for example, the terminal connection section from an outside is provided in a housing of vehicle electric equipment such as an inverter, and a switch for detecting that a cover has opened is provided in the cover covering the opening. An installation space of the switch and the like has prevented the vehicle electric equipment from being reduced in size.

An object of the present invention is to reduce vehicle electric equipment in size.

Technical Solution

An aspect of the present invention is a structure of vehicle electric equipment including a restriction member restricting a removal of a bolt for fixing a cover. The restriction member includes a first portion and a second portion. The first portion is disposed at a position overlapping with at least a part of a distal end of a connector of an electric cable when seen from an attachment/detachment direction and between the distal end and a portion of a housing opposed to the distal end in the attachment/detachment direction. The second portion is positioned on an axial extension of the bolt fixing the cover. Further, a sum of a gap between the bolt fixing the cover and the second portion and a distance in the attachment/detachment direction between the distal end of the connector in a complete fitting state and the first portion is smaller than a length from an opening of the screw hole to a tip of the bolt.

Advantageous Effects

The structure make it possible to reduce vehicle electric equipment in size.

DESCRIPTION OF EMBODIMENTS

Figure 1:
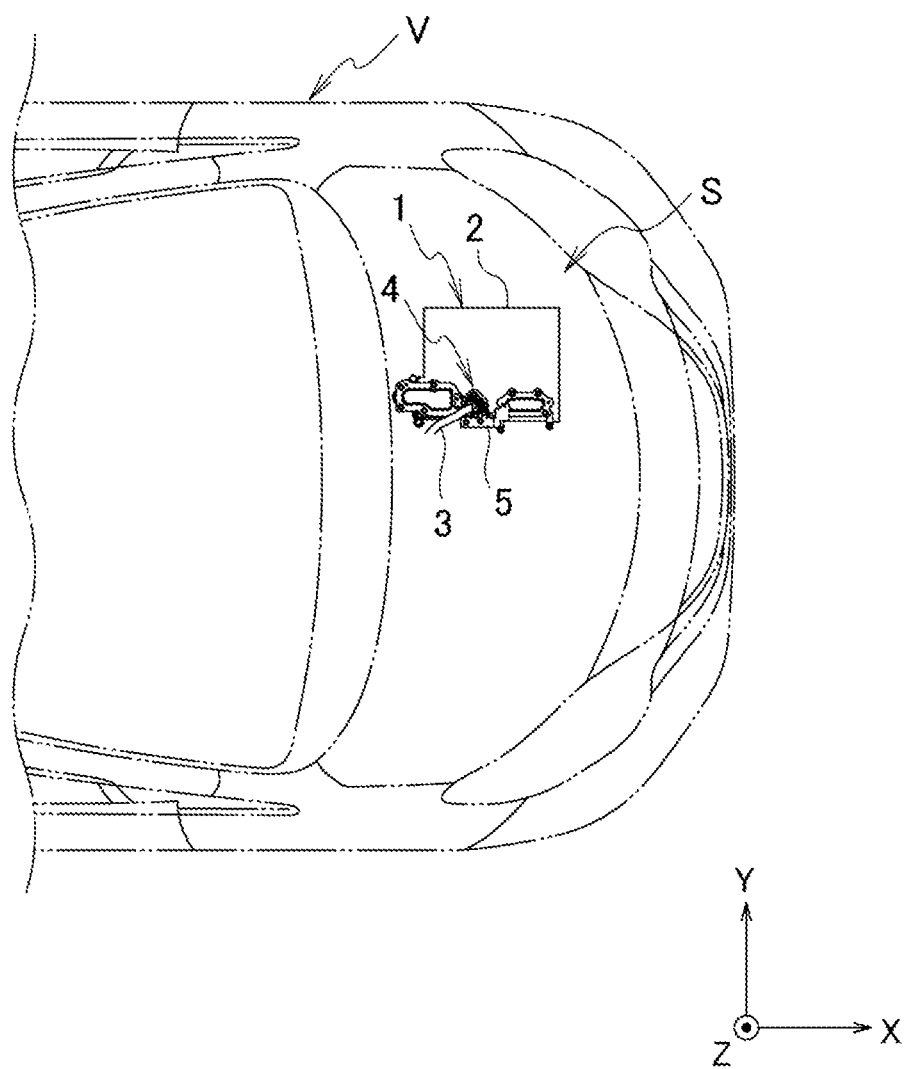
FIG. 1 is a layout of electric equipment according to an embodiment.

A structure S of vehicle electric equipment according to some embodiments will be described with reference to the drawings. In the following description, elements having the same functions are denoted by the same reference numerals, and overlapping descriptions thereof are omitted.

First Embodiment

Figure 2:
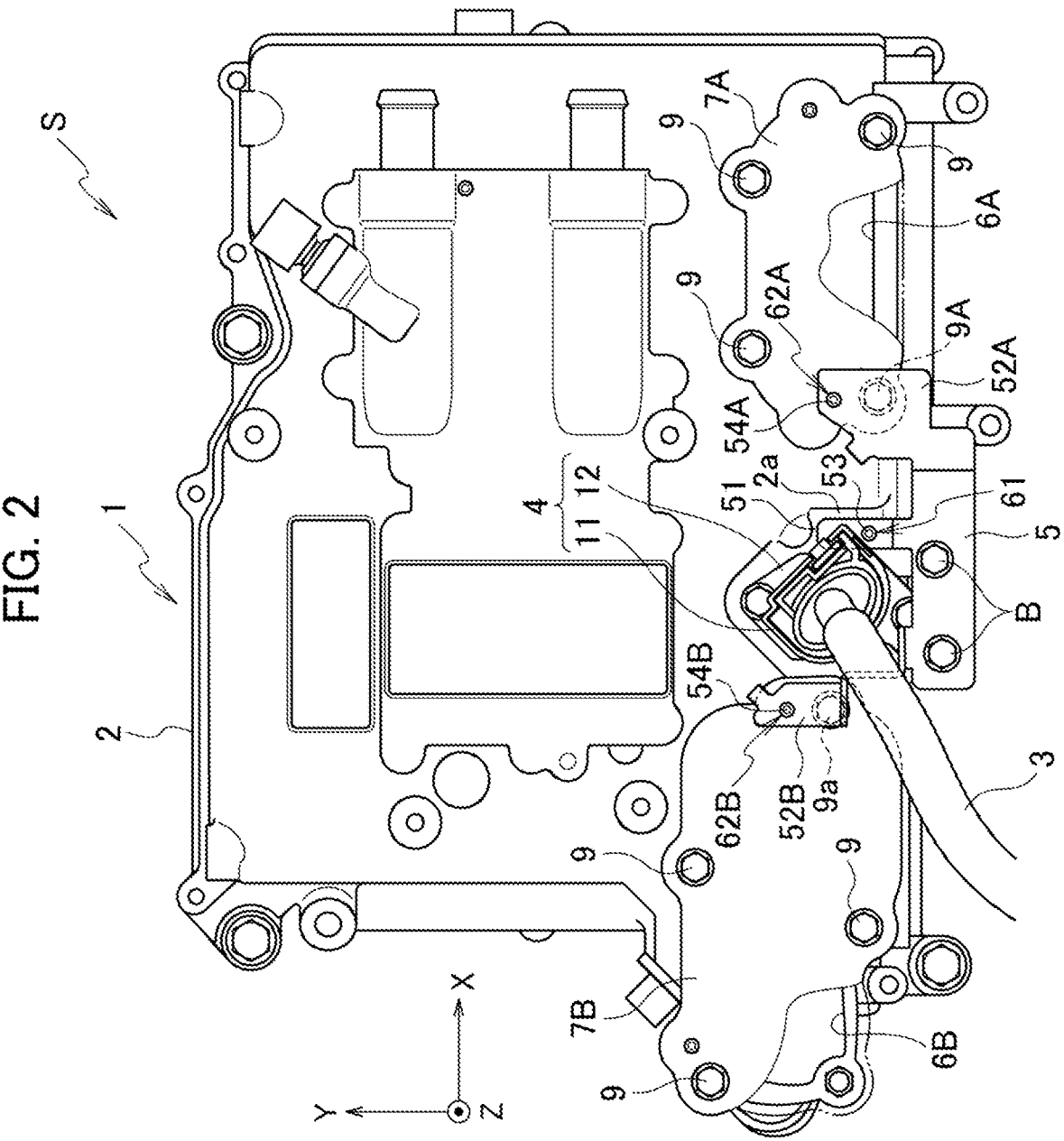
FIG. 2 is a plan view of the electric equipment according to the embodiment.

As illustrated in FIG. 1 and FIG. 2, the structure S of a first embodiment is a structure of an inverter 1, and includes a housing 2, an electric cable 3, a connector 4, and a restriction member 5.

As illustrated in FIG. 1, the inverter 1 is mounted on a vehicle V and electrically connected to an electric motor (not illustrated) for driving the vehicle V, a battery (not illustrated) for storing electric power generated by the electric motor, and the like. The inverter 1, for example, converts DC power stored in the battery into AC power, generates frequencies necessary for vehicle speed and system control, and controls a motor rotational speed and drive torque to accelerate and decelerate the vehicle V.

The inverter 1 includes components such as high power electrical components (not illustrated), and the housing 2 for housing these components. The components include, for example, a power module including a power semiconductor element such as an IGBT (Integrated Gate Bipolar Transistor), a power module drive circuit, a motor control circuit, a smoothing capacitor, a bus bar, a current sensor, and the like.

As illustrated in FIG. 2, the housing 2 is provided with an opening 6A for permitting access to components in the housing 2 from the outside. The access through the opening 6A can typically occur during maintenance, such as when fastening terminals of bus bars or power cables to terminal fastening sections in the housing 2 with bolts. Normally, the opening 6A is covered with a cover 7A made of, for example, a steel plate for waterproofing. A plurality of screw holes 8 (see FIG. 6) are provided on a peripheral edge of the opening 6A. The cover 7A is fixed to the housing 2 by a plurality of bolts 9 screwed into the screw holes 8.

The housing 2 is provided with the other opening 6B for permitting access to the components in the housing 2 from the outside. The opening 6B is covered with a cover 7B. The plurality of screw holes 8 (see FIG. 6) are provided on a peripheral edge of the opening 6B, and the cover 7B is fixed to the housing 2 by the plurality of bolts 9 screwed into the screw holes 8. Hereinafter, the openings 6A and 6B may be collectively referred to as the opening 6, and the covers 7A and 7B may be collectively referred to as the cover 7. In FIG.

2, in order to show a layout of the openings 6A and 6B, a part of the covers 7A and 7B is omitted. A two-dot chain line in FIG. 2 illustrates an outline of an omitted portion of the covers 7A and 7B. In the present embodiment, an axial direction of the bolt 9 is parallel to an attachment/detachment direction of the connector 4 (a direction parallel to Z axis in each figure), but the axial direction of the bolt 9 may be non-parallel to the attachment/detachment direction of the connector 4.

The electric cable 3 electrically connects the inverter 1 to electric equipment other than the inverter 1. The electric cable 3 of the present embodiment is a high-voltage cable, and electrically connects a compressor of an on-vehicle air conditioner (not illustrated) and an inverter for compressor included in the inverter 1. The electric cable 3 is not limited to a high-voltage cable. The electric equipment to which the electric cable 3 is connected is not limited to a compressor.

Figure 3:
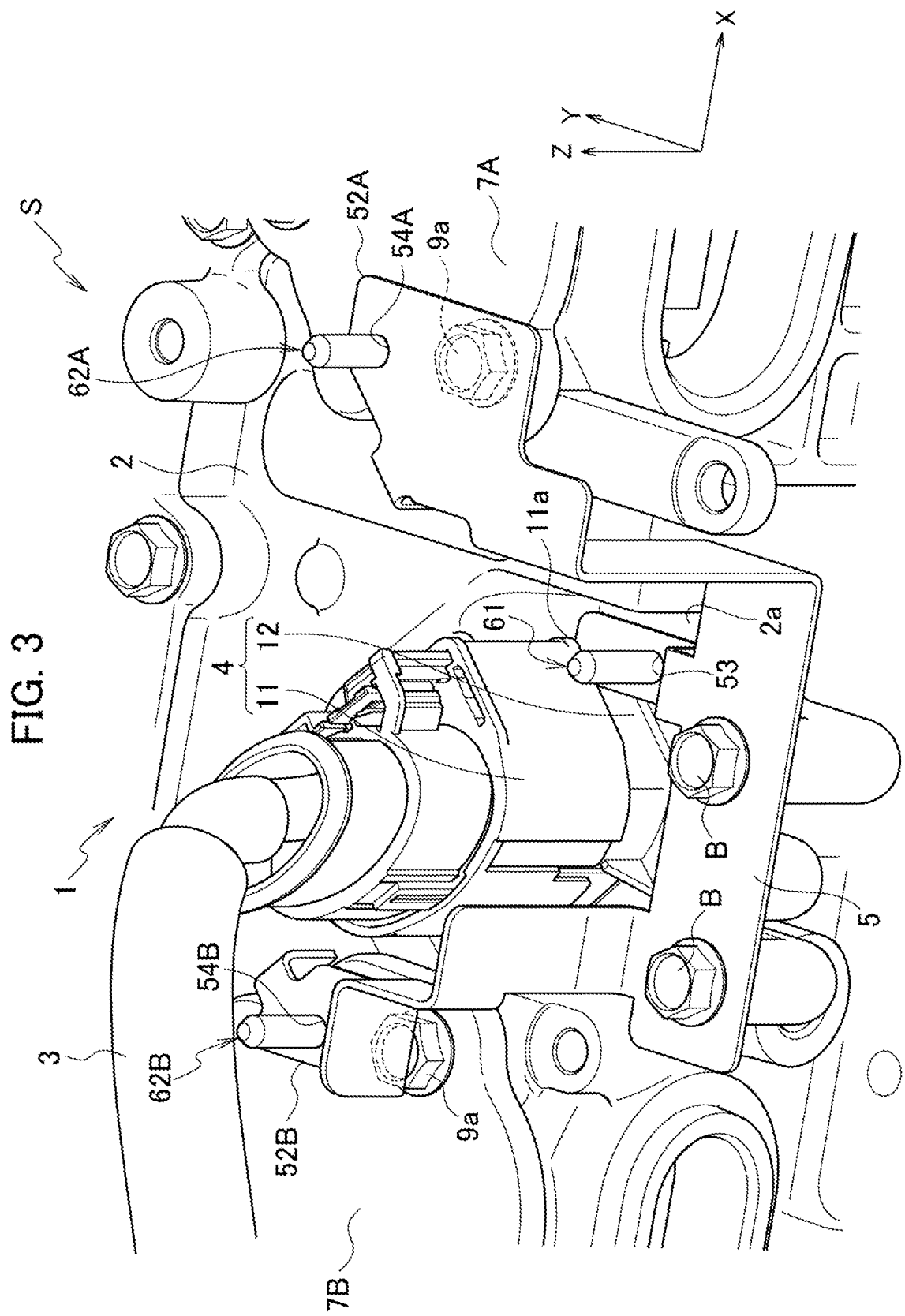
FIG. 3 is a perspective view of a main portion of the electric equipment according to the embodiment.

As illustrated in FIG. 3, the electric cable 3 is coupled to the inverter 1 via the connector 4. The connector 4 includes a first connector 11 provided on the electric cable 3 and a second connector 12 provided in the housing 2. The second connector 12 is detachably fitted to the first connector 11 by moving the first connector 11 in the attachment/detachment direction relative to the second connector 12.

Figure 4:
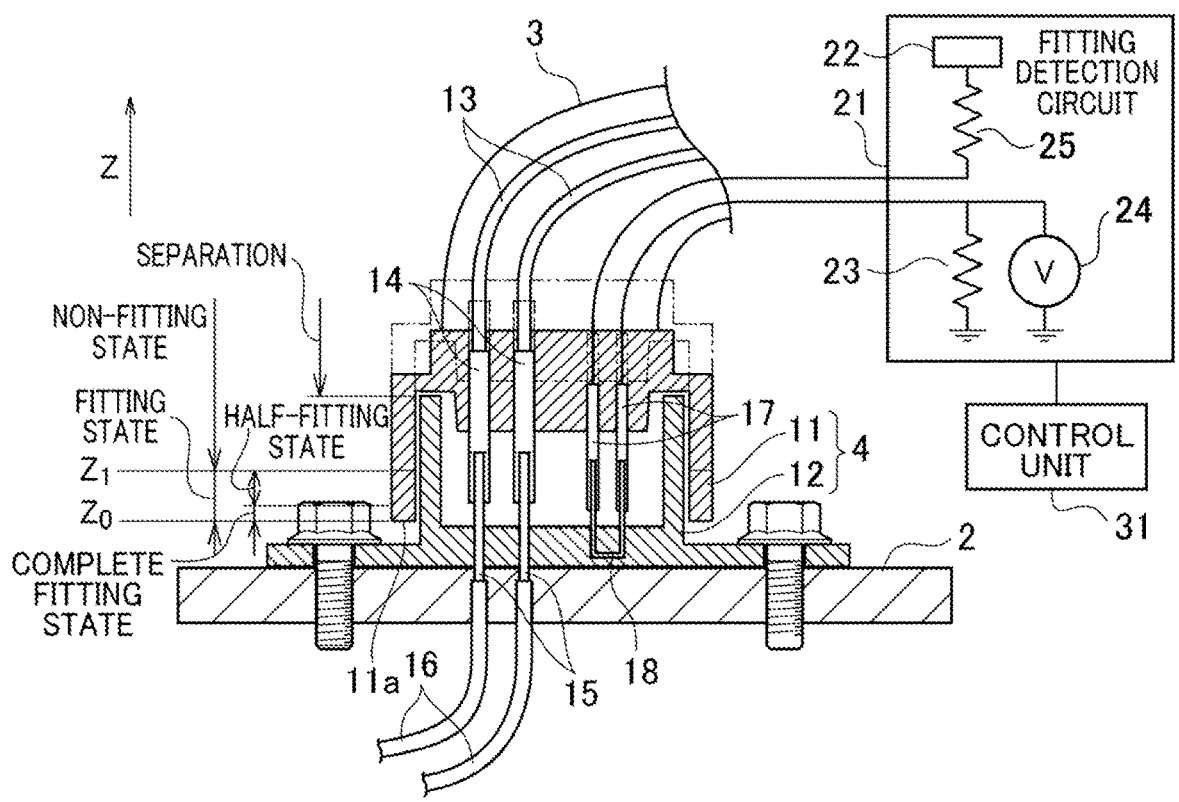
FIG. 4 is a cross-sectional view schematically illustrating a configuration of a connector according to the embodiment.

As illustrated in FIG. 4, the first connector 11 may be a plug having two female contacts 14 each connected to a conductor wire 13 of the electric cable 3. The second connector 12 may be a receptacle with two male contacts 15 each inserted into two female contacts 14. Each of the two male contacts 15 may be connected to respective output terminals of the compressor inverter (not illustrated) via wiring 16 in the housing 2.

As illustrated in FIG. 4, the first connector 11 includes a pair of contacts 17, and the second connector 12 includes a short-circuit terminal 18. In a fitting state where the first connector 11 and the second connector 12 are fitted, the pair of contacts 17 is brought into contact with the short-circuit terminal 18 to conduct or short-circuit each other. In a non-fitting state where the first connector 11 and the second connector 12 are not fitted, the pair of contacts 17 is separated from the short-circuit terminal 18 and do not conduct (do not short-circuit) each other.

Here, when the first connector 11 is moved in the attachment/detachment direction with respect to the second connector 12, a position where the fitting state is changed to the non-fitting state is defined as a boundary position $z_1$. In the present embodiment, when the first connector 11 is positioned within a range from a forward limit position $z_0$ to the boundary position $z_1$ with respect to the second connector 12, the contacts 17 conduct each other and are in a fitting state. When the first connector 11 is positioned rearward of the boundary position $z_1$ with respect to the second connector 12 (to the separation side), the contacts 17 do not conduct each other and are in a non-fitting state.

The first connector 11 is completely fitted to the second connector 12 at and near the forward limit position $z_0$. A state in this situation is referred to as a complete fitting state, and a position of the first connector 11 with respect to the second connector 12 in this situation is referred to as a complete fitting position. That is, as illustrated in FIG. 4, the fitting state includes a complete fitting state, and an incomplete fitting state (half-fitting state) in which the first connector 11 and the second connector 12 are not completely fitted but the contacts 17 conduct each other. Further, the non-fitting state includes a separation state where the first connector 11 is separated from the second connector 12. The first connector 11 in the complete fitting state may be locked to the complete fitting position by a known locking mechanism.

The pair of contacts 17 is connected to a fitting detection circuit 21. As illustrated in FIG. 4, the fitting detection circuit 21 may include a DC power supply 22, a resistor 23, and a voltage sensor 24. In this case, the DC power supply 22 is connected to one of the pair of contacts 17. The resistor 23 has one end connected to the other of the pair of contacts 17 and the other end connected to ground potential. The voltage sensor 24 detects a potential of one end of the resistor 23, that is, the potential (voltage to ground potential) of the other of the pair of contacts 17. The fitting detection circuit 21 may include a resistor 25. The resistor 25 has one end connected to one of the pair of contacts 17 and the other end connected to a DC power supply 22.

In the fitting state, since the pair of contacts 17 conduct each other, a current output from the DC power supply 22 flows to the resistor 23, and the voltage sensor 24 detects a voltage corresponding to a voltage drop caused by the current. In the non-fitting state, since the pair of contacts 17 do not conduct each other, no current flows through the resistor 23, and the voltage detected by the voltage sensor 24 becomes a ground potential. A voltage of the DC power supply 22 is not particularly limited, but is, for example, 5V. In addition, a resistance value of the resistor 23 is, for example, 2700Ω.

In the above example, although the voltage sensor 24 detects the potential of the other of the pair of contacts 17, the voltage sensor 24 may detect the potential of the one of the pair of contacts 17. In this case, in the fitting state, a current output from the DC power supply 22 flows to the resistor 25, and the voltage sensor 24 detects a voltage obtained by subtracting the voltage corresponding to the voltage drop caused by the current from the voltage of the DC power supply 22. In the non-fitting state, no current flows through the resistor 25, and the voltage detected by the voltage sensor 24 becomes a potential of the DC power supply 22.

The control unit 31 connected to the fitting detection circuit 21 detects which of the fitting state and the non-fitting state is selected based on a detection voltage of the voltage sensor 24 which changes between the fitting state and the non-fitting state as described above. In the example illustrated in FIG. 4, the control unit 31 compares a voltage value indicated by a detection signal output from the voltage sensor 24 with a threshold value, and when the voltage value indicated by the detection signal is larger than the threshold value, the control unit 31 detects that the first connector 11 and the second connector 12 are in the fitting state. In contrast, when the voltage value indicated by the detection signal output from the voltage sensor 24 is smaller than the threshold value, the control unit 31 detects that the first connector 11 and the second connector 12 are in the non-fitting state.

By detecting the fitting state or the non-fitting state, the control unit 31 may, for example, stop a high voltage output, hold a relay connecting a battery and the inverter 1 in a non-conductive state, or turn on an alarm lamp while the non-fitting state is detected. The control unit 31 may include a general-purpose microcomputer including a CPU (central processing unit), a memory, and an input/output unit. A computer program may be installed in the control unit 31. The control unit 31 may perform a fitting detection function by executing a computer program. The processing circuitry implementing the functions of the control unit 31 may include a programmed processor, an electric circuit, a device such as an application specific integrated circuit (ASIC), a circuit element disposed to perform the described function, and the like.

Figure 5:
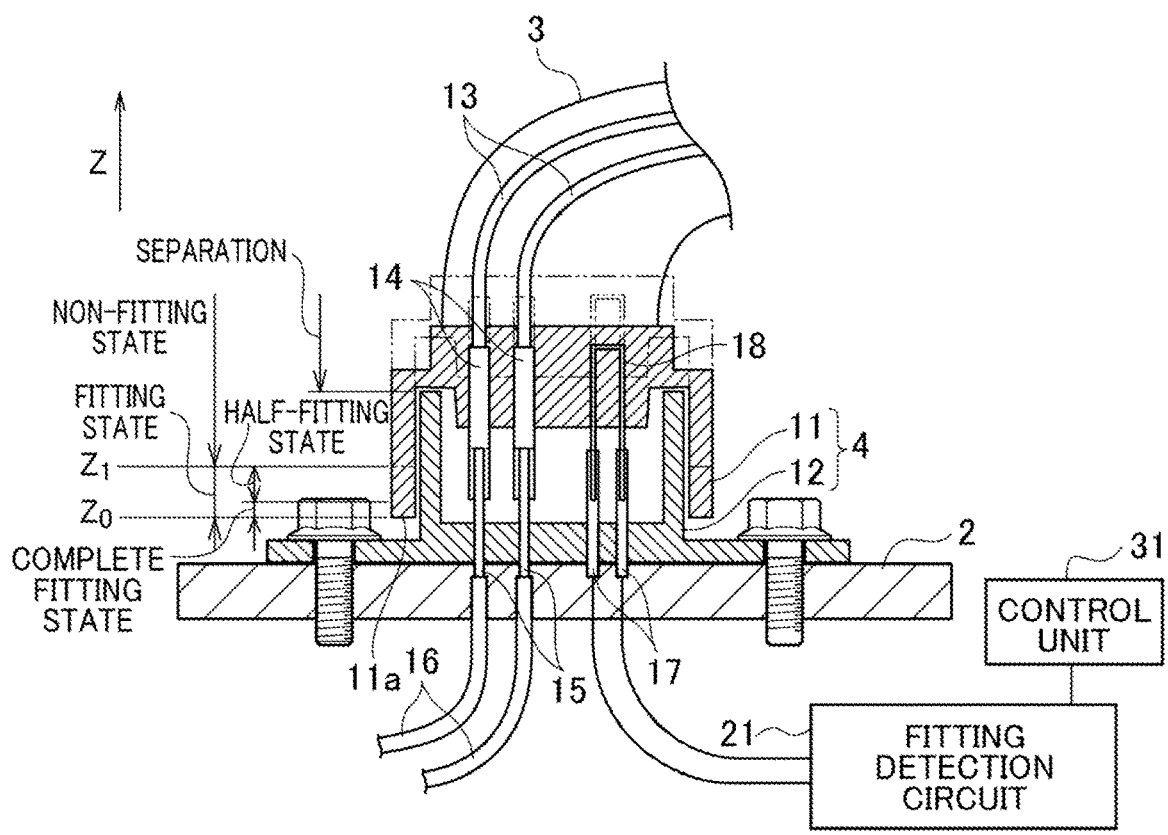
FIG. 5 is a cross-sectional view schematically illustrating a configuration of the connector according to the embodiment.

In the example of FIG. 4, the pair of contacts 17 is provided in the first connector 11 and the short-circuit terminal 18 is provided in the second connector 12, but the present invention is not limited thereto. As illustrated in FIG. 5, the pair of contacts 17 may be provided in the second connector 12, and the short-circuit terminal 18 may be provided in the first connector 11.

In the present embodiment, as illustrated in FIG. 2 and FIG. 3, a restriction member 5 for restricting a removal of the bolt 9 is provided. The restriction member 5 is made of, for example, a steel plate and is removably fixed to the housing 2 by a fastening member such as a bolt B. A shape of the restriction member 5 is not limited to that illustrated in the drawings, and may be appropriately selected in accordance with the size, shape, layout, etc. of the housing 2, the first connector 11, the second connector 12, the cover 7, the bolt 9, etc.

The restriction member 5 includes, as a part thereof, a first portion 51 and a second portion 52A respectively extending in a direction substantially orthogonal to the attachment/detachment direction. As illustrated in FIG. 2 and FIG. 3, the first portion 51 is interposed between a distal end 11a of the first connector 11 in the complete fitting state in the attachment/detachment direction and a portion 2a of the housing 2 opposed to the distal end 11a in the attachment/detachment direction. As illustrated in FIG. 2 and FIG. 3, the first portion 51 is disposed at a position where at least a part thereof overlaps with at least a part of the distal end 11a when seen from the attachment/detachment direction. A portion of the distal end 11a of the first connector 11 that overlaps the first portion 51 when seen from the attachment/detachment direction is a portion having a fixed relative positional relationship with the contacts 17 in the case of FIG. 4, and a portion having a fixed relative positional relationship with the short-circuit terminal 18 in the case of FIG. 5.

As illustrated in FIG. 2 and FIG. 3, the second portion 52A is positioned on an axial extension of one of the plurality of bolts 9 (Hereinafter referred to as a first bolt 9a) fixing the cover 7A in a state where the restriction member 5 is fixed to the housing 2. That is, at least a part of the second portion 52A is disposed at a position overlapping with at least a part of a head of the first bolt 9a when seen from an axial direction of the first bolt 9a. In this state, a gap $G_1$ in the axial direction of the first bolt 9a between the first bolt 9a for fixing the cover 7A and the second portion 52A is smaller than a length $L_1$ from an opening 8a of the screw hole 8 to a tip 9b of the first bolt 9a, as illustrated in FIG. 6.

Figure 6:
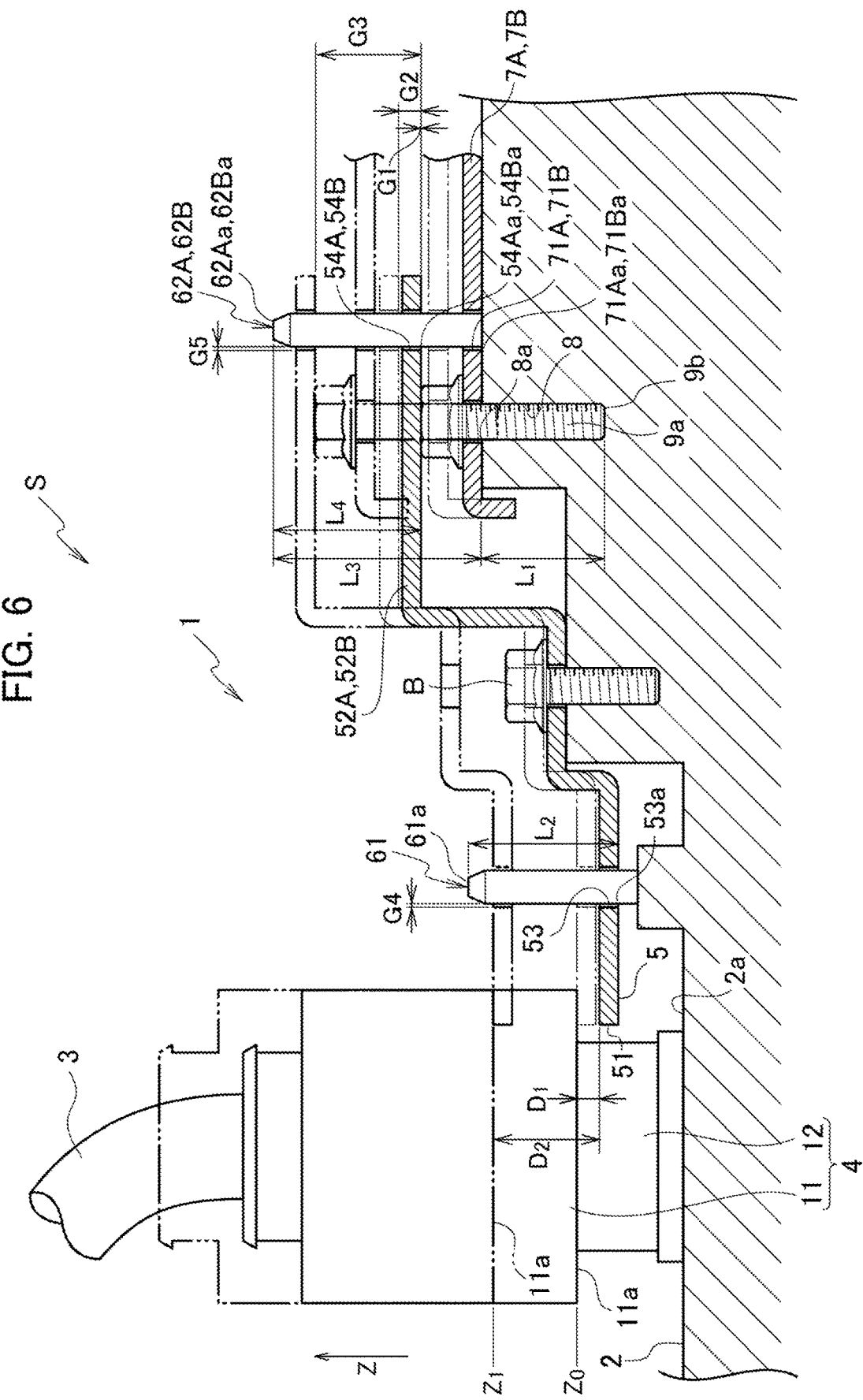
FIG. 6 is a diagram illustrating a configuration of a main portion of the electric equipment according to the embodiment.

Further, even in a state where the restriction member 5 is released from being fixed to the housing 2 and the first portion 51 abuts on the first connector 11 in the complete fitting state, as illustrated in FIG. 6, the second portion 52A is positioned on the axial extension of the first bolt 9a for fixing the cover 7A. Even in this state, a size of gap $G_2$ in the axial direction of the first bolt 9a between the first bolt 9a for fixing the cover 7A and the second portion 52A is smaller than the length $L_1$ from the opening 8a of the screw hole 8 to the tip 9b of the first bolt 9a. That is, in a state where the restriction member 5 is fixed to the housing 2, when the distance in the attachment/detachment direction between the first portion 51 and the distal end 11a of the first connector 11 in the complete fitting state is defined as $D_1$, the sum of the distance $D_1$ and the gap $G_1$ is smaller than the length $L_1$.

Further, even when the first portion 51 abuts on the first connector 11 positioned at the boundary position $z_1$, as illustrated in FIG. 6, the second portion 52A is positioned on the axial extension of the first bolt 9a for fixing the cover 7A. Even in this state, a size of gap $G_3$ in the axial direction of the first bolt 9a between the first bolt 9a for fixing the cover 7A and the second portion 52A is smaller than the length $L_1$ from the opening 8a of the screw hole 8 to the tip 9b of the first bolt 9a. That is, in a state where the restriction member 5 is fixed to the housing 2, when the distance in the attachment/detachment direction between the first portion 51 and the distal end 11a of the first connector 11 positioned at the boundary position $z_1$ is defined as $D_2$, the sum of the distance $D_2$ and the gap $G_1$ is smaller than the length $L_1$.

As illustrated in FIG. 2 and FIG. 3, the restriction member 5 of the present embodiment includes another second portion 52B. The second portion 52B is also positioned on the axial extension of the first bolt 9a, which is one of the plurality of bolts 9 for fixing the cover 7B, in a state where the restriction member 5 is fixed to the housing 2 and in a state where the restriction member 5 is released from being fixed thereto and the first portion 51 abuts on the first connector 11 in the fitting state. In any of these states, the sizes of the gaps $G_1$, $G_2$ and $G_3$ in the axial direction of the first bolt 9a between the first bolt 9a for fixing the cover 7B and the second portion 52B are smaller than the length $L_1$ from the opening 8a of the screw hole 8 to the tip 9b of the first bolt 9a. Hereinafter, the second portions 52A and 52B may be collectively referred to as the second portion 52.

In the present embodiment, the restriction member 5 is mechanically restrained from rotating and moving in a direction orthogonal to the attachment/detachment direction by a housing side member provided in the housing 2. As illustrated in FIGS. 2, 3, and 6, the housing 2 is provided with a first positioning pin 61 that is a first pin extending in the attachment/detachment direction as a housing side member. The restriction member 5 is provided with a first hole 53 through which the first positioning pin 61 is inserted. A gap $G_4$ between an inner peripheral surface of the first hole 53 and an outer peripheral surface of the first positioning pin 61 is sufficiently small, and a rotation (tilting) of the restriction member 5 around the axis orthogonal to the attachment/detachment direction and the movement of the restriction member 5 in the direction orthogonal to the attachment/detachment direction are restrained by a mechanical interference between the inner peripheral surface and the outer peripheral surface.

Here, as illustrated in FIG. 6, in a state where the restriction member 5 is fixed to the housing 2, the length from an end 53a of the first hole 53 on the side of the proximal end of the first positioning pin 61 to a tip 61a of the first positioning pin 61 is defined as $L_2$. In the present embodiment, the length $L_2$ is set to be larger than the distance $D_2$.

As illustrated in FIGS. 2, 3, and 6, the housing 2 is provided with a second positioning pin 62A that is a second pin extending in the attachment/detachment direction as a housing side member at a position different from the first positioning pin 61. The cover 7A is provided with a second hole 71A through which the second positioning pin 62A is inserted.

Here, as illustrated in FIG. 6, in a state where the cover 7A is fixed to the housing 2, the length from an end 71Aa of the second hole 71A on the side of the proximal end of the second positioning pin 62A to a tip 62Aa of the second positioning pin 62A is defined as $L_3$. In the same state, the length from the opening 8a of the screw hole 8 to a tip 9b of the first bolt 9a for fixing the cover 7A is defined as $L_1$. In the present embodiment, the length $L_3$ is set to be larger than the length $L_1$.

As illustrated in FIGS. 2, 3, and 6, the restriction member 5 is provided with a third hole 54A through which the second positioning pin 62A is inserted. A gap $G_5$ between an inner peripheral surface of the third hole 54A and an outer peripheral surface of the second positioning pin 62A is sufficiently small, and a rotation (tilting) of the restriction member 5 around the axis orthogonal to the attachment/detachment direction and the movement of the restriction member 5 in the direction orthogonal to the attachment/detachment direction are restrained by a mechanical interference between the inner peripheral surface and the outer peripheral surface. The rotation of the restriction member 5 around the axis parallel to the attachment/detachment direction is mechanically restrained by a mechanical interference between the inner peripheral surface of the first hole 53 and the outer peripheral surface of the first positioning pin 61 and between the inner peripheral surface of the third hole 54A and the outer peripheral surface of the second positioning pin 62A.

Here, as illustrated in FIG. 6, in a state where the restriction member 5 is fixed to the housing 2, the length from an end 54Aa of the third hole 54A on the side of the proximal end of the second positioning pin 62A to the tip 62Aa of the second positioning pin 62A is defined as $L_4$. In the present embodiment, the length $L_4$ is set to be larger than the distance $D_2$.

Further, as illustrated in FIG. 2 and FIG. 3, the housing 2 may be provided with a second positioning pin 62B. The cover 7B covering the opening 6B may be provided with a second hole 71B through which the second positioning pin 62B is inserted. The restriction member 5 may be provided with a third hole 54B through which the second positioning pin 62B is inserted. As illustrated in FIG. 6, in a state the cover 7B is fixed to the housing 2, the length from an end 71Ba of the second hole 71B on the side of the proximal end of the second positioning pin 62B to a tip 62Ba of the second positioning pin 62B is the length $L_3$. In the same state, the length from the opening 8a of the screw hole 8 to the tip 9b of the first bolt 9a for fixing the cover 7B is the length $L_1$. Further, in a state where the restriction member 5 is fixed to the housing 2, the length from an end 54Ba of the third hole 54B on the side of the proximal end of the second positioning pin 62B to the tip 62Ba of the second positioning pin 62B is the length $L_4$. Hereinafter, the second positioning pins 62A and 62B may be collectively referred to as the second positioning pin 62, the second holes 71A and 71B as the second hole 71, and the third holes 54A and 54B as the third hole 54.

In the present embodiment, as described above, the rotation of the restriction member 5 and the movement thereof in the direction orthogonal to the attachment/detachment direction are restrained by a mechanical interference between the first positioning pin 61 and the first hole 53 and between the second positioning pin 62 and the third hole 54. However, the method of restraint is not limited to this. For example, the restriction member 5 may be guided in a non-rotatable manner and in a non-movable manner in a direction orthogonal to the attachment/detachment direction by utilizing a side surface (flat surface, curved surface, recessed groove, convex, etc.) extending substantially in parallel to the attachment/detachment direction in a housing-side member. Examples of the housing-side member include a surface of the housing 2 or a concave or a convex formed on the surface of the housing 2 and having the above side surface, and a member fixed or attached to the housing 2 and having the above side surface. In addition, the rotation of the restriction member 5 and the movement thereof in the direction orthogonal to the attachment/detachment direction may be restrained by a mechanical interference, not only with the housing-side member, but with members provided in a structure other than the housing 2 and other equipment disposed around the inverter 1.

In the present embodiment, a cross section of the first positioning pin 61 and the shape of the first hole 53, and a cross section of the second positioning pin 62 and the shape of the second hole 71 are all circulars, but the shape may be elliptical, polygonal, or the like. When the shape is non-circular, a rotation of the restriction member 5 around the axis parallel to the attachment/detachment direction may be restrained only by a combination of the pair of positioning pins and the hole by the engagement of the outer peripheral surface of the positioning pin with the inner peripheral surface of the hole.

Further, although in the present embodiment, the second portions 52A and 52B are disposed so as to be positioned on the axial extension of the first bolt 9a, these may be disposed so as to be positioned on the axial extension of two or more bolts 9 including the first bolt 9a.

The operation and effect of the present embodiment will be described below.

In the structure S of the present embodiment, the first portion 51 is disposed at a position overlapping at least a part of the distal end 11a of the first connector 11 when seen from the attachment/detachment direction and between the distal end 11a of the first connector 11 in the complete fitting state and the portion 2a of the housing 2 opposed to the distal end 11a in the attachment/detachment direction. The second portion 52 is positioned on the axial extension of the first bolt 9a for fixing the cover 7.

Furthermore, the sum of the gap $G_1$ in the axial direction of the first bolt 9a between the first bolt 9a for fixing the cover 7 and the second portion 52 and the distance $D_1$ in the attachment/detachment direction between the distal end 11a of the first connector 11 in the complete fitting state and the first portion 51 is smaller than the length $L_1$ from the opening 8a of the screw hole 8 to the tip 9b of the first bolt 9a. Therefore, for example, even when the first bolt 9a is loosened for removal after the bolt B is loosened and the restriction member 5 is released from being fixed to the housing 2, the first portion 51 abuts (mechanically interferes with) on the first connector 11 in the complete fitting state and the second portion 52 mechanically interferes with the loosened first bolt 9a before the first bolt 9a comes out of the screw hole 8. For this reason, when the first connector 11 is in the complete fitting state, the first bolt 9a cannot be removed even if the restriction member 5 is released from being fixed to the housing 2. Thus, the cover 7 is prevented from being removed, and access to the components in the housing 2 through the opening 6 is restricted.

In other words, in the structure S of the present embodiment, in order to remove the first bolt 9a, it is necessary to remove the restriction member 5 beforehand, and in order to remove the restriction member 5, it is necessary to release the first connector 11 from the complete fitting state beforehand. Accordingly, an operator who intends to remove the cover 7 is first urged to remove the first connector 11 from the second connector 12. When the first connector 11 is removed, the first connector 11 is changed to the non-fitting state, and the pair of contacts 17 lose conduction. As described above, the structure S of the present embodiment makes it possible to detect the possibility that the cover 7 is removed, that is, the possibility that access to the components in the housing 2 through the opening 6 occurs from the loss of conduction between the pair of contacts 17. This makes it possible to take safety measures such as stopping a high voltage output when the conduction between the contacts 17 is lost.

In addition, according to the structure S of the present embodiment, whether or not there is a possibility of opening the cover can be detected from the presence or absence of a short circuit (conduction) between the pair of contacts 17 provided in either one of the first connector 11 and the second connector 12. Therefore, it is not necessary to install an opening detection switch or the like on the cover 7 covering the opening 6. This makes it possible to reduce the cost and the size of the inverter 1 by reducing the number of components.

Further, according to the structure S of the present embodiment, the restriction member 5 includes the two second portions 52. Therefore, even when the plurality of openings 6 are formed in the housing 2 and the plurality of covers 7 are provided for the respective openings 6, the removal of the covers 7 can be prevented by the single restriction member 5. Thus, it is not necessary to install an opening detection switch for the respective covers 7. This makes it possible to further reduce the number of components, thereby further reducing the cost.

Further, according to the structure S of the present embodiment, the sum of the gap $G_1$ in the axial direction of the first bolt 9a between the first bolt 9a for fixing the cover 7 and the second portion 52 and the distance $D_2$ in the attachment/detachment direction between the distal end 11a of the first connector 11 positioned at the boundary position $z_1$ and the first portion 51 is smaller than the length $L_1$ from the opening 8a of the screw hole 8 to the tip 9b of the first bolt 9a. Therefore, even when the first bolt 9a is loosened for removal after the restriction member 5 is released from being fixed to the housing 2, the first portion 51 abuts (mechanically interferes with) on the first connector 11 positioned at the boundary position $z_1$ and the second portion 52 mechanically interferes with the loosened first bolt 9a before the first bolt 9a comes out of the screw hole 8. For this reason, even when the first connector 11 is positioned at the boundary position $z_1$, the first bolt 9a cannot be removed. That is, as long as the first connector 11 is in the fitting state, the cover 7 is prevented from being removed, and access to the components in the housing 2 through the opening 6 is restricted.

Further, according to the structure S of the present embodiment, the length $L_2$ is larger than the distance $D_2$ in a state where the restriction member 5 is fixed to the housing 2. Therefore, even when an operator moves the restriction member 5 until it abuts on the first connector 11 when the first connector 11 is positioned at the boundary position $z_1$, the first positioning pin 61 does not come out of the first hole 53. This makes it possible to reliably prevent the restriction member 5 from being removed with a simple structure.

Further, according to the structure S of the present embodiment, the length $L_3$ is larger than the length $L_1$ in a state where the cover 7 is fixed to the housing 2. Therefore, even when an operator moves the restriction member 5 until it abuts on the first connector 11 at the boundary position $z_1$, loosens the first bolt 9a until it abuts on the second portion 52 and removes the cover 7, the second positioning pin 62 does not come out of the second hole 71. As a result, since the first bolt 9a and the second positioning pin 62 are held in a state such that the first bolt 9a and the second positioning pin 62 penetrate the cover 7, the rotation of the cover 7 around the axis parallel to the attachment/detachment direction is prevented. This makes it possible to reliably restrict access to the components in the housing 2 through the opening 6.

Further, according to the structure S of the present embodiment, the length $L_4$ is larger than the distance $D_2$ in a state where the restriction member 5 is fixed to the housing 2. Therefore, even when an operator moves the restriction member 5 until it abuts on the first connector 11 when the first connector 11 is positioned at the boundary position $z_1$, the second positioning pin 62 does not come out of the third hole 54. With this configuration, the second positioning pin 62 makes it possible to prevent the cover 7 from being rotated and the restriction member 5 from being removed.

Other Embodiments

Next, the other embodiments will be described with reference to FIGS. 7 to 9. In the following description, only the configuration different from that of the first embodiment will be described, and elements having the same functions as those described above will be given the same reference numerals and their description will be omitted.

Figure 7:
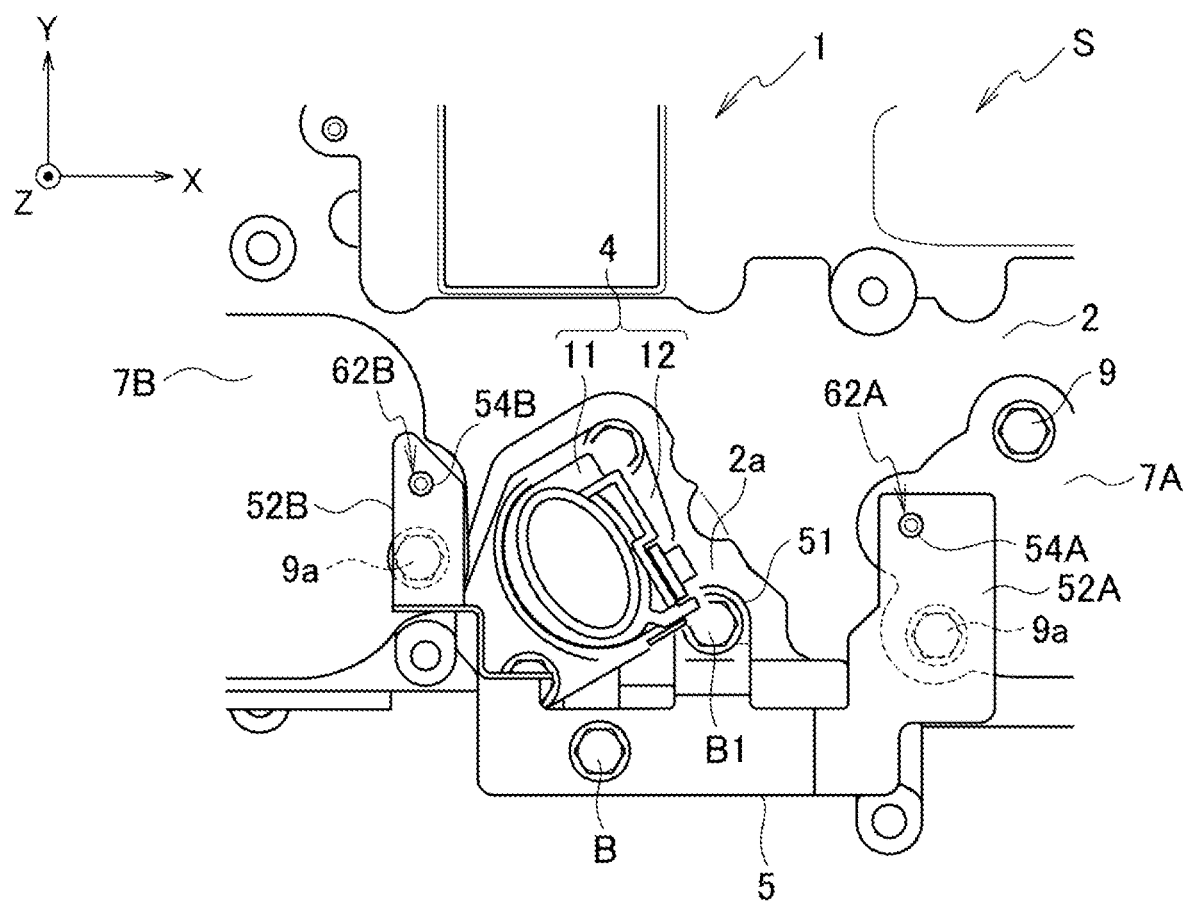
FIG. 7 is a perspective view of a main portion of electric equipment according to a second embodiment.
Figure 8:
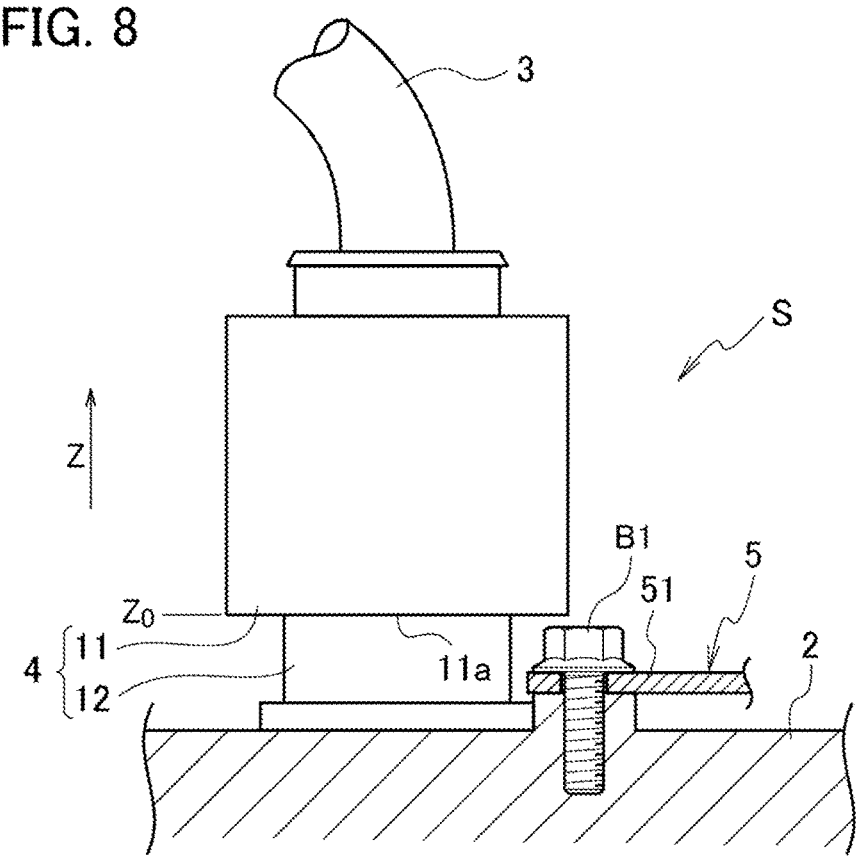
FIG. 8 is a perspective view of a main portion of the electric equipment according to the second embodiment.

In the second embodiment, as illustrated in FIG. 7 and FIG. 8, the restriction member 5 is fixed to the housing 2 by a second bolt B1 extending in the attachment/detachment direction. A head of the second bolt B1 is disposed at a position overlapping at least a part of the distal end 11a of the first connector 11 when seen from the attachment/detachment direction and between the distal end 11a in the attachment/detachment direction of the first connector 11 in the complete fitting state and the portion 2a of the housing 2 opposed to the distal end 11a in the attachment/detachment direction. This narrows the space around the second bolt B1, and restricts access to the second bolt B1, thereby making it difficult to remove the second bolt B1 without separating the first connector 11 from the second connector 12. That is, this configuration makes it more difficult to remove the restriction member 5 when the first connector 11 is in the fitting state, and makes it possible to more reliably prevent the restriction member 5 from being removed.

Figure 9:
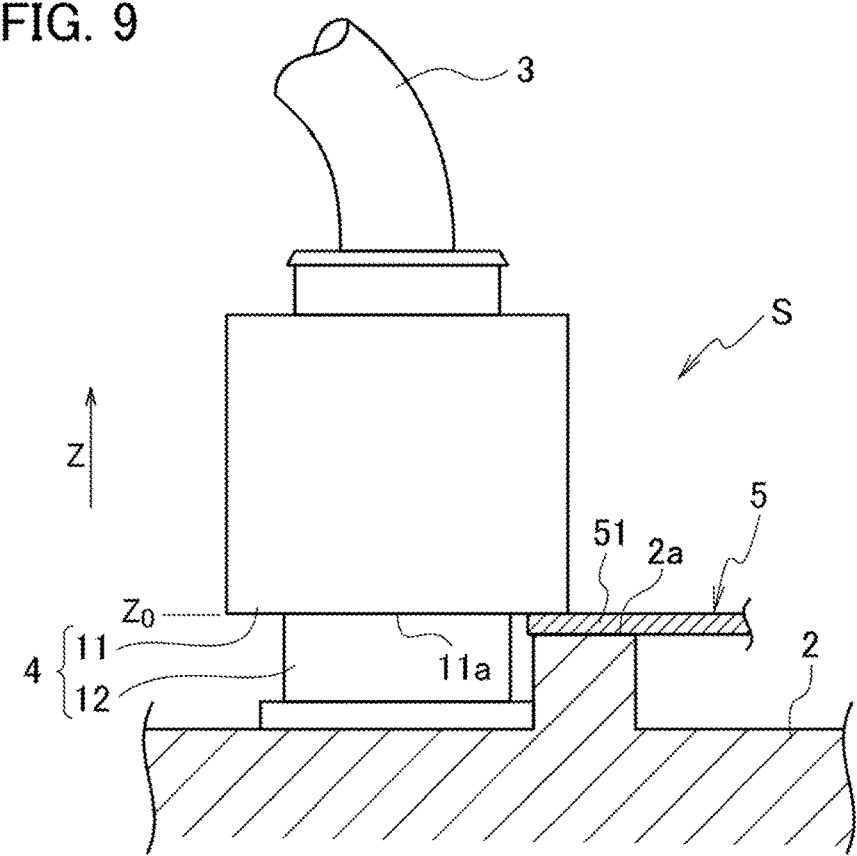
FIG. 9 is a perspective view of a main portion of electric equipment according to a third embodiment.

In the third embodiment, as illustrated in FIG. 9, in a state where the restriction member 5 is fixed to the housing 2, the first portion 51 is held between the distal end 11a of the first connector 11 and the portion 2a of the housing 2 opposed to the distal end 11a in the attachment/detachment direction. Therefore, the amount of movement of the restriction member 5 until the first portion 51 abuts on the first connector 11 after the restriction member 5 is released from being fixed to the housing 2 is smaller than the case where the first portion 51 is not held between the distal end 11a and the portion 2a. For this reason, when the first portion 51 abuts on the first connector 11, the gaps $G_2$ and $G_3$ formed between the first bolt 9a and the second portion 52 can be made smaller, and the length required for the first bolt 9a can be made smaller.

The first to third embodiments can be applied by combining any two or more. In combinatorial embodiments, the effects of each combined embodiment can be obtained.

The above embodiments are merely illustrative examples provided for ease of understanding of the invention. The technical scope of the invention is not limited to the specific technical matters disclosed in the above embodiments, but also includes various modifications, changes, and alternative technologies that can be easily derived therefrom.

Although an inverter has been described as an example of vehicle electric equipment in the above embodiments, the present invention can also be applied to vehicle electric equipment other than an inverter, such as a DC/DC converter, a junction box and an electric air conditioner compressor.

REFERENCE SIGNS LIST

S Structure of vehicle electric equipment
1 Inverter (vehicle electric equipment)
2 Housing
2a Portion opposed to distal end in attachment/detachment direction
3 Electric cable
5 Restriction member
51 First portion
52A, 52B Second portion
53 First hole
53a End of first hole
54A, 54B Third hole
54Aa, 54Ba End of third hole
6A, 6B Opening
7A, 7B Cover
71A, 71B Second hole
71Aa, 71Ba End of second hole
8 Screw hole
8a Opening of screw hole
9a First bolt (bolt)
9b Tip of first bolt (tip of bolt)
11 First connector
11a Distal end
12 Second connector
17 Pair of contacts
18 Short-circuit terminal
61 First positioning pin (First pin)
61a Tip
62A, 62B Second positioning pin (Second pin)
62Aa,62Ba Tip
B1 Second bolt
$z_1$ Boundary position
$D_1$ Distance between distal end of first connector in complete fitting state and first portion
$D_2$ Distance between distal end of first connector poisoned at boundary position and first portion
$G_1$ to $G_3$ Gaps in axial direction of bolt between bolt for fixing cover and second portion
$L_1$ Length from opening of screw hole to tip of bolt for fixing cover
$L_2$ Length from end of first hole to tip of first positioning pin (first pin)
$L_3$ Length from end of second hole to tip of second positioning pin (second pin)
$L_4$ Length from end of third hole to tip of second positioning pin (second pin)

The invention claimed is:

1. A structure of vehicle electric equipment comprising:
a housing for the vehicle electric equipment;
an electric cable;
a first connector provided on the electric cable;
a second connector provided in the housing and detachably fitted to the first connector by moving the first connector in an attachment/detachment direction relative to the second connector;
a short-circuit terminal provided in one of the first connector and the second connector;
a pair of contacts provided in the other of the first connector and the second connector, the pair of contacts configured to be brought into contact with the short-circuit terminal to conduct each other in a fitting state where the first connector and the second connector are fitted, and to be separated from the short-circuit terminal and not to conduct each other in a non-fitting state where the first connector and the second connector are not fitted;
an opening, which is provided in the housing, for permitting access to components in the housing from an outside;
a cover covering the opening;
a bolt screwed into a screw hole provided in the housing to fix the cover to the housing; and
a restriction member fixed to the housing and restricting a removal of the bolt, wherein
a first portion of the restriction member is disposed at a position overlapping with at least a part of a distal end in the attachment/detachment direction of the first connector when seen from the attachment/detachment direction and between the distal end of the first connector in a complete fitting state where the first connector are completely fitted to the second connector and a portion of the housing opposed to the distal end in the attachment/detachment direction,
a second portion of the restriction member is positioned on an axial extension of the bolt fixing the cover, and
a sum of a gap in an axial direction of the bolt between the bolt fixing the cover and the second portion and a distance in the attachment/detachment direction between the distal end of the first connector in the complete fitting state and the first portion is smaller than a length from an opening of the screw hole to a tip of the bolt fixing the cover.

2. The structure of vehicle electric equipment according to claim 1, wherein,
when a position of the first connector where the fitting state is changed to the non-fitting state is defined as a boundary position,
a sum of a gap in an axial direction of the bolt between the bolt fixing the cover and the second portion and a distance in the attachment/detachment direction between the distal end of the first connector positioned at the boundary position and the first portion is smaller than a length from the opening of the screw hole to the tip of the bolt fixing the cover.

3. The structure of vehicle electric equipment according to claim 2, wherein
the housing is provided with a first pin extending in the attachment/detachment direction,
the restriction member is provided with a first hole through which the first pin is inserted, and
a length from an end of the first hole on a side of a proximal end of the first pin to a tip of the first pin is larger than a distance in the attachment/detachment direction between the first portion and the distal end of the first connector positioned at the boundary position.

4. The structure of vehicle electric equipment according to claim 2, wherein
the housing is provided with a second pin extending in the attachment/detachment direction,
the cover is provided with a second hole through which the second pin is inserted, and
a length from an end of the second hole on a side of a proximal end of the second pin to a tip of the second pin is larger than a length from the opening of the screw hole to the tip of the bolt fixing the cover.

5. The structure of vehicle electric equipment according to claim 4, wherein the restriction member is provided with a third hole through which the second pin is inserted, and a length from an end of the third hole on the side of the proximal end of the second pin to a tip of the second pin is larger than a distance in the attachment/detachment direction between the first portion and the distal end of the first connector positioned at the boundary position.

6. The structure of vehicle electric equipment according to claim 1, wherein the restriction member is fixed to the housing by a second bolt extending in the attachment/detachment direction, and a head of the second bolt is disposed at a position overlapping at least a part of the distal end of the first connector when seen from the attachment/detachment direction and between the distal end of the first connector in the complete fitting state and the portion of the housing opposed to the distal end in the attachment/detachment direction.

7. The structure of vehicle electric equipment according to claim 1, wherein the first portion is held between the distal end of the first connector and the portion of the housing opposed to the distal end in the attachment/detachment direction.

\* \* \* \* \*